United States Patent
Zhang et al.

(10) Patent No.: US 12,439,440 B2
(45) Date of Patent: Oct. 7, 2025

(54) INTERFERENCE MITIGATION FOR A USER EQUIPMENT

(71) Applicant: QUALCOMM Incorporated, San Diego, CA (US)

(72) Inventors: Qian Zhang, Basking Ridge, NJ (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 18/296,946

(22) Filed: Apr. 6, 2023

(65) Prior Publication Data

US 2024/0340941 A1 Oct. 10, 2024

(51) Int. Cl.
*H04L 12/26* (2006.01)
*H04W 24/08* (2009.01)
*H04W 24/10* (2009.01)
*H04W 72/12* (2023.01)
*H04W 72/541* (2023.01)

(52) U.S. Cl.
CPC ......... *H04W 72/541* (2023.01); *H04W 24/08* (2013.01); *H04W 24/10* (2013.01); *H04W 72/12* (2013.01)

(58) Field of Classification Search
CPC ... H04W 72/541; H04W 24/08; H04W 24/10; H04W 72/12; H04B 7/0617; H04B 7/0695; H04J 11/0023
See application file for complete search history.

(56) References Cited

U.S. PATENT DOCUMENTS

| | | | |
|---|---|---|---|
| 12,363,528 B2 * | 7/2025 | Kim | H04W 12/082 |
| 2009/0213007 A1 * | 8/2009 | Shan | H04B 7/0404 |
| | | | 342/367 |
| 2016/0286432 A1 * | 9/2016 | Centonza | H04W 28/04 |
| 2021/0289445 A1 * | 9/2021 | Muruganathan | H04W 52/146 |
| 2023/0354215 A1 * | 11/2023 | Huang | H04W 72/232 |
| 2024/0064577 A1 * | 2/2024 | Wahid | H04W 28/0268 |
| 2024/0340941 A1 * | 10/2024 | Zhang | H04W 24/10 |

FOREIGN PATENT DOCUMENTS

| | | | | |
|---|---|---|---|---|
| WO | WO-2011159988 A1 * | 12/2011 | | H04W 24/10 |
| WO | WO-2016048214 A1 * | 3/2016 | | H04J 11/0056 |

* cited by examiner

*Primary Examiner* — Thai Dinh Hoang
(74) *Attorney, Agent, or Firm* — Harrity & Harrity, LLP

(57) ABSTRACT

Various aspects of the present disclosure generally relate to wireless communication. In some aspects, a network node may receive an indication of one or more of: an identifier of a neighbor user equipment (UE) associated with a neighbor network node, a location and mobility status of a UE served by the network node, or beam adaptation information of the UE served by the network node. The network node may perform an interference mitigation for the UE served by the network node based at least in part on the indication of one or more of: the identifier of the neighbor UE, the location and mobility status of the UE, or the beam adaptation information of the UE. Numerous other aspects are described.

30 Claims, 11 Drawing Sheets

INTERFERENCE MITIGATION FOR A USER EQUIPMENT

FIELD OF THE DISCLOSURE

Aspects of the present disclosure generally relate to wireless communication and to techniques and apparatuses for interference mitigation for a user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a network node includes a memory and one or more processors, coupled to the memory, configured to: receive an indication of one or more of: an identifier of a neighbor user equipment (UE) associated with a neighbor network node, a location and mobility status of a UE served by the network node, or beam adaptation information of the UE served by the network node; and perform an interference mitigation for the UE served by the network node based at least in part on the indication of one or more of: the identifier of the neighbor UE, the location and mobility status of the UE, or the beam adaptation information of the UE.

In some implementations, an apparatus for wireless communication at a UE includes a memory and one or more processors, coupled to the memory, configured to: transmit an indication of one or more of: a location and mobility status of the UE, or beam adaptation information of the UE, the UE being served by a network node; and receive an indication of a scheduling, the scheduling being associated with an interference mitigation based at least in part on the indication of one or more of: the location and mobility status of the UE, or the beam adaptation information of the UE.

In some implementations, a method of wireless communication performed by a network node includes receiving an indication of one or more of: an identifier of a neighbor UE associated with a neighbor network node, a location and mobility status of a UE served by the network node, or beam adaptation information of the UE served by the network node; and performing an interference mitigation for the UE served by the network node based at least in part on the indication of one or more of: the identifier of the neighbor UE, the location and mobility status of the UE, or the beam adaptation information of the UE.

In some implementations, a method of wireless communication performed by a UE includes transmitting an indication of one or more of: a location and mobility status of the UE, or beam adaptation information of the UE, the UE being served by a network node; and receiving an indication of a scheduling, the scheduling being associated with an interference mitigation based at least in part on the indication of one or more of: the location and mobility status of the UE, or the beam adaptation information of the UE.

In some implementations, a non-transitory computer-readable medium storing a set of instructions for wireless communication includes one or more instructions that, when executed by one or more processors of a network node, cause the network node to: receive an indication of one or more of: an identifier of a neighbor UE associated with a neighbor network node, a location and mobility status of a UE served by the network node, or beam adaptation information of the UE served by the network node; and perform an interference mitigation for the UE served by the network node based at least in part on the indication of one or more of: the identifier of the neighbor UE, the location and mobility status of the UE, or the beam adaptation information of the UE.

In some implementations, a non-transitory computer-readable medium storing a set of instructions for wireless communication includes one or more instructions that, when executed by one or more processors of a UE, cause the UE to: transmit an indication of one or more of: a location and mobility status of the UE, or beam adaptation information of the UE, the UE being served by a network node; and receive an indication of a scheduling, the scheduling being associated with an interference mitigation based at least in part on the indication of one or more of: the location and mobility status of the UE, or the beam adaptation information of the UE.

In some implementations, an apparatus for wireless communication includes means for receiving an indication of one or more of: an identifier of a neighbor UE associated with a neighbor apparatus, a location and mobility status of a UE served by the apparatus, or beam adaptation information of the UE served by the apparatus; and means for performing an interference mitigation for the UE served by the apparatus based at least in part on the indication of one or more of: the identifier of the neighbor UE, the location and mobility status of the UE, or the beam adaptation information of the UE.

In some implementations, an apparatus for wireless communication includes means for transmitting an indication of one or more of: a location and mobility status of the apparatus, or beam adaptation information of the apparatus, the apparatus being served by a network node; and means for receiving an indication of a scheduling, the scheduling being associated with an interference mitigation based at least in part on the indication of one or more of: the location and mobility status of the apparatus, or the beam adaptation information of the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
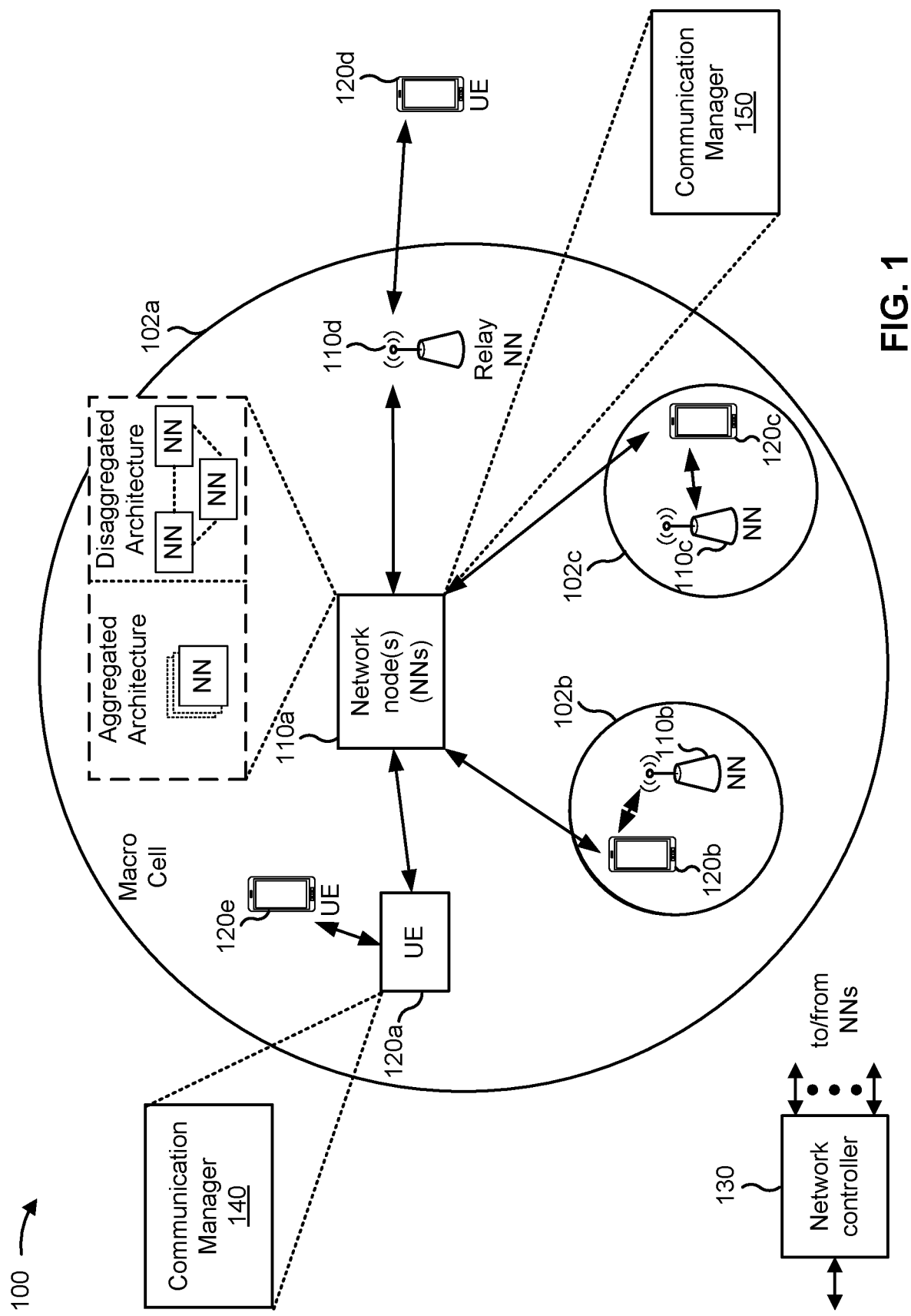
FIG. 1 is a diagram illustrating an example of a wireless network, in accordance with the present disclosure.

An interferer, such as a user equipment (UE), which may include a customer premise equipment (CPE) or a wireless access backhaul (WAB) (CPE/WAB), or a network node, may need to be distinguished so that the network node may apply interference mitigation to CPE/WAB-to-gNB links. However, the UE and/or the network node may not be configured to identify the interferer in such situations, thereby resulting in a lack of interference mitigation to the CPE/WAB-to-gNB links. The lack of interference mitigation to the CPE/WAB-to-gNB links may degrade a performance of the UE and/or the network node.

In some aspects described herein, a network node may receive an indication of an identifier of a neighbor UE associated with a neighbor network node, a location and mobility status of a UE served by the network node, and/or beam adaptation information of the UE served by the network node. The UE may be a CPE or a WAB. The UE may operate with a larger antenna array as compared to an enhanced mobile broadband (eMBB) UE. The network node may perform an interference mitigation for the UE served by the network node based at least in part on the indication of the identifier of the neighbor UE, the location and mobility status of the UE, and/or the beam adaptation information of the UE. The interference mitigation may include a UE-to-UE cross-link interference (CLI) mitigation, a networknode-to-network-node CLI mitigation, a UE-to-network-node interference mitigation, or a network node-to-UE interference mitigation. The interference mitigation may improve a performance of the UE and/or the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the
electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FRI is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a network node (e.g., the network node 110) may include a communication manager 150. As described in more detail elsewhere herein, the communication manager 150 may receive an indication of one or more of: an identifier of a neighbor UE associated with a neighbor network node, a location and mobility status of a UE served by the network node, or beam adaptation information of the UE served by the network node; and perform an interference mitigation for the UE served by the network node based at least in part on the indication of one or more of: the identifier of the neighbor UE, the location and mobility status of the UE, or the beam adaptation information of the UE. Additionally, or alternatively, the communication manager 150 may perform one or more other operations described herein.

In some aspects, a UE (e.g., the UE 120) may include a communication manager 140. As described in more detail elsewhere herein, the communication manager 140 may transmit an indication of one or more of: a location and mobility status of the UE, or beam adaptation information of the UE, the UE being served by a network node; and receive an indication of a scheduling, the scheduling being associated with an interference mitigation based at least in part on the indication of one or more of: the location and mobility status of the UE, or the beam adaptation information of the UE. Additionally, or alternatively, the communication manager 140 may perform one or more other operations described herein.

As indicated above, FIG. 1 is provided as an example. Other examples may differ from what is described with regard to FIG. 1.

Figure 2:
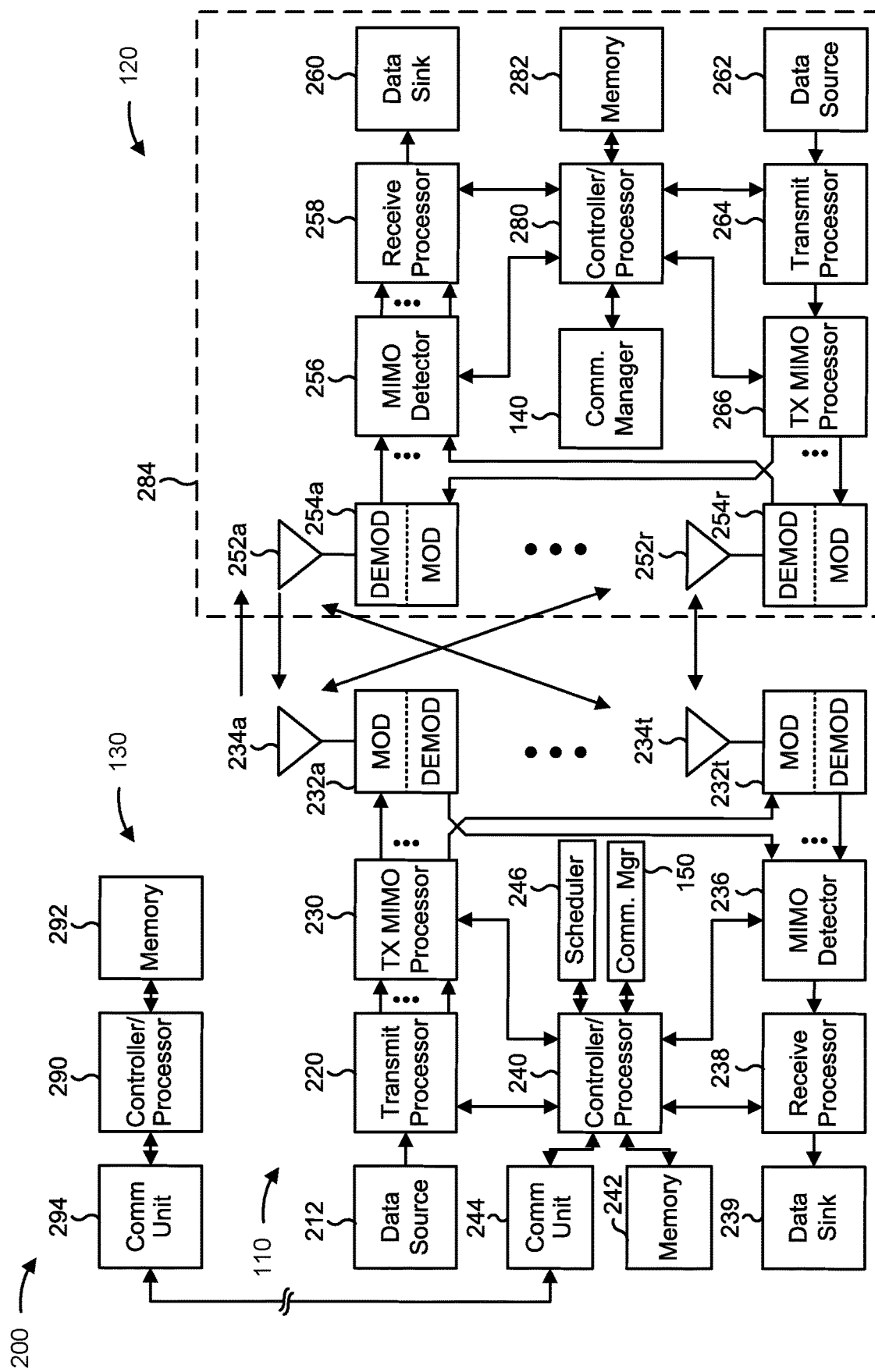
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with interference mitigation for a UE, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a network node (e.g., the network node 110) includes means for receiving an indication of one or more of: an identifier of a neighbor UE associated with a neighbor network node, a location and mobility status of a UE served by the network node, or beam adaptation information of the UE served by the network node; and/or means for performing an interference mitigation for the UE served by the network node based at least in part on the indication of one or more of: the identifier of the neighbor UE, the location and mobility status of the UE, or the beam adaptation information of the UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE (e.g., the UE 120) includes means for transmitting an indication of one or more of: a location and mobility status of the UE, or beam adaptation information of the UE, the UE being served by a network node; and/or means for receiving an indication of a scheduling, the scheduling being associated with an interference mitigation based at least in part on the indication of one or more of: the location and mobility status of the UE, or the beam adaptation information of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
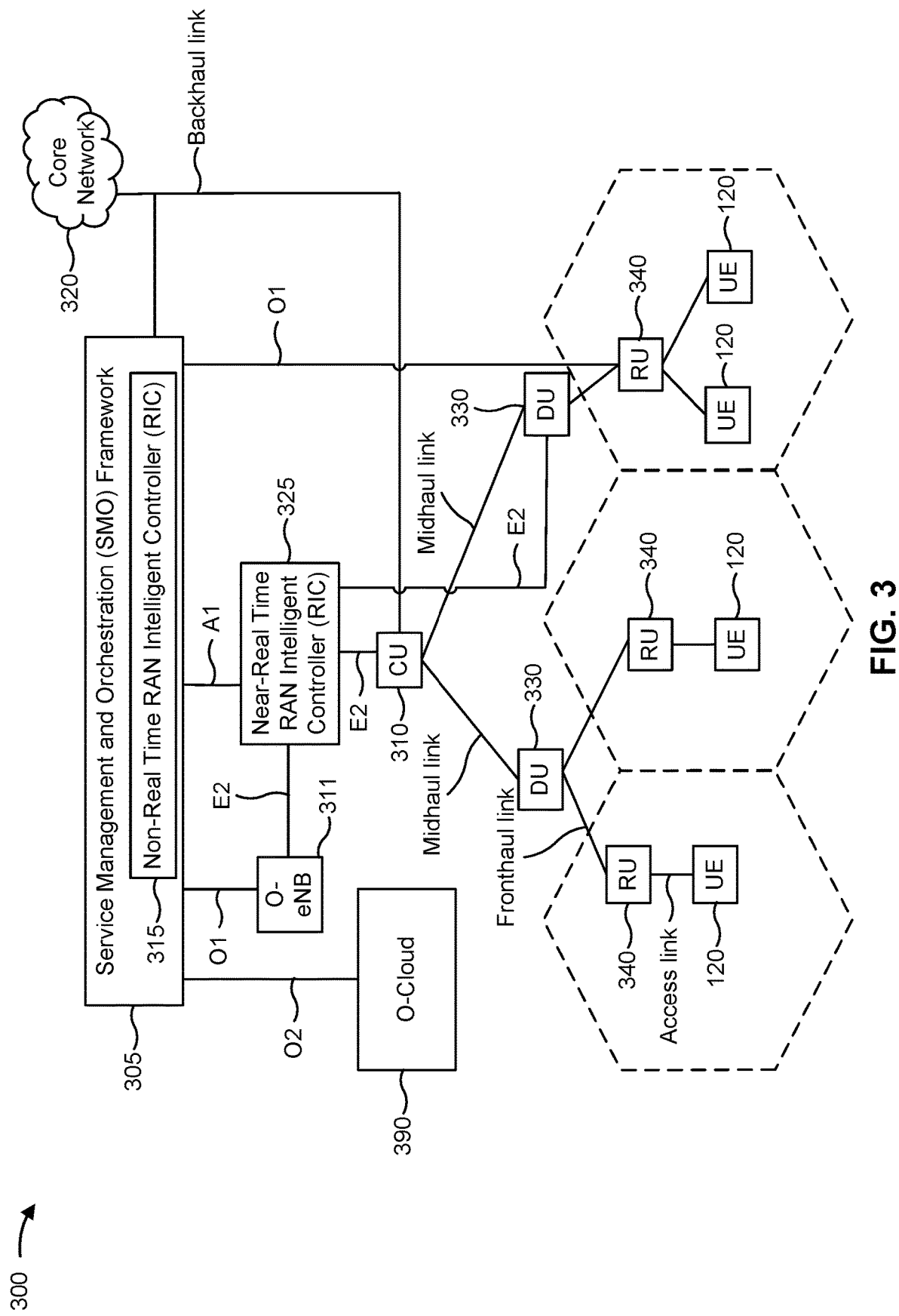
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces.

Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over-the-air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via a creation of RAN management policies (such as A1 interface policies).

As indicated above, FIG. 3 is provided as an example. Other examples may differ from what is described with regard to FIG. 3.

A full duplex operation may involve an in-band full duplex (IBFD) operation, in which a transmission and a reception may occur on the same time and frequency resource. A downlink direction and an uplink direction may share the same IBFD time/frequency resource based at least in part on a full or partial overlap. Alternatively, the full duplex operation may involve a sub-band full duplex (SBFD) operation (or flexible duplex), in which a transmission and a reception may occur at the same time but on different frequency resources. A downlink resource may be separated from an uplink resource in a frequency domain. In the SBFD operation, no downlink and uplink overlap in frequency may occur.

Figure 4:
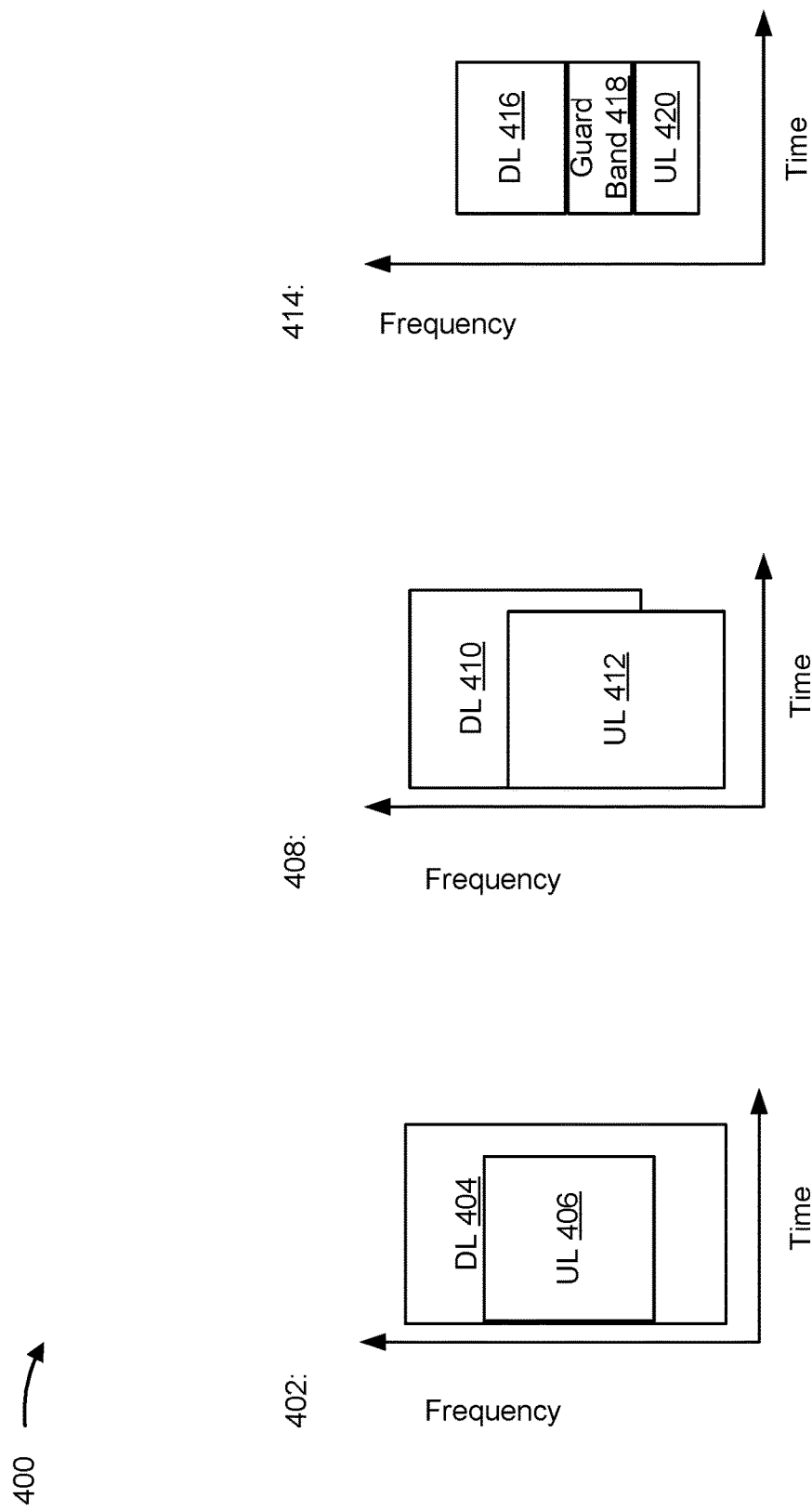
FIG. 4 is a diagram illustrating examples of full duplex communications, in accordance with the present disclosure.

FIG. 4 is a diagram illustrating examples 400 of full duplex communications, in accordance with the present disclosure.

As shown by reference number 402, a downlink resource 404 and an uplink resource 406 may share the same IBFD time/frequency resource based at least in part on a full overlap. As shown by reference number 408, a downlink resource 410 and an uplink resource 412 may share the same IBFD time/frequency resource based at least in part on a partial overlap. As shown by reference number 414, a downlink resource 416 and an uplink resource 420 may be associated with a same time but different frequencies. The downlink resource 416 and the uplink resource 420 may be separated by a guard band 418.

As indicated above, FIG. 4 is provided as an example. Other examples may differ from what is described with regard to FIG. 4.

Figure 5:
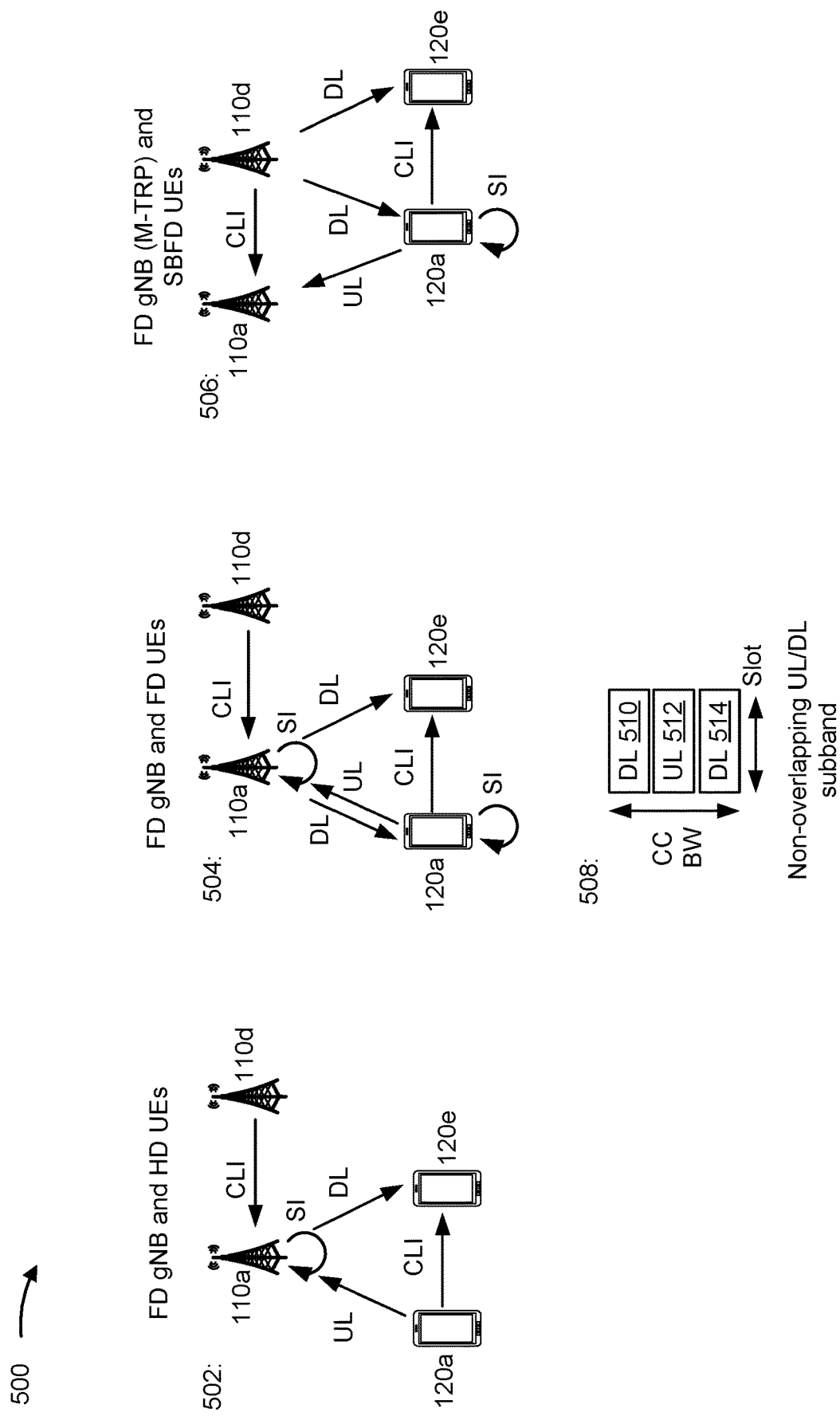
FIG. 5 is a diagram illustrating examples of full duplex communications, in accordance with the present disclosure.

FIG. 5 is a diagram illustrating examples 500 of full duplex communications, in accordance with the present disclosure.

As shown by reference number 502, a full duplex network node (e.g., network node 110a) may communicate with half duplex UEs. The full duplex network node may be subjected to cross-link interference from another full duplex network node (e.g., network node 110d). The cross-link interference from the other full duplex network node may be inter-network-node cross-link interference. The full duplex network node may experience self-interference. The full duplex network node may receive an uplink transmission from a first half duplex UE (e.g., UE 120a), and the full duplex network node may transmit a downlink transmission to a second half duplex UE (e.g., UE 120e). The full duplex network node may receive the uplink transmission and transmit the downlink transmission on the same slot (e.g., a simultaneous reception/transmission). The second half duplex UE may be subjected to cross-link interference from the first half duplex UE (e.g., inter-UE cross-link interference).

As shown by reference number 504, a full duplex network node (e.g., network node 110a) may communicate with full duplex UEs. The full duplex network node may be subjected to cross-link interference from another full duplex network node (e.g., network node 110d). The full duplex network node may experience self-interference. The full duplex network node may transmit a downlink transmission to a first full duplex UE (e.g., UE 120a), and the full duplex network node may receive an uplink transmission from the first full duplex UE at the same time as the downlink transmission. The full duplex network node may transmit a downlink transmission to a second full duplex UE (e.g., UE 120e). The second half duplex UE may be subjected to cross-link interference from the first half duplex UE. The first UE may experience self-interference.

As shown by reference number 506, a first full duplex network node (e.g., network node 110*a*), which may be associated with multiple TRPs, may communicate with SBFD UEs. The first full duplex network node may be subjected to cross-link interference from a second full duplex network node (e.g., network node 110*s*). The first full duplex network node may receive an uplink transmission from a first SBFD UE (e.g., UE 120*a*). The second full duplex network node may transmit downlink transmissions to both the first SBFD UE and a second SBFD UE (e.g., UE 120*e*). The second SBFD UE may be subjected to cross-link interference from the first SBFD UE. The first SBFD UE may experience self-interference.

As shown by reference number 508, an SBFD slot may be associated with a non-overlapping uplink/downlink sub-band. The SBFD slot may be associated with a simultaneous transmission/reception of a downlink/uplink on a sub-band basis. Within a component carrier bandwidth, an uplink resource 512 may be between, in a frequency domain, a first downlink resource 510 and a second downlink resource 514. The first downlink resource 510, the second downlink resource 514, and the uplink resource 512 may all be associated with the same time.

An SBFD operation may be associated with a time division duplexing (TDD) or an intra-band carrier aggregation (CA). The SBFD operation may increase an uplink duty cycle, which may result in a latency reduction (e.g., an uplink signal may be transmitted in downlink-only slots, or a downlink signal may be received in uplink-only slots, which may enable latency savings) and uplink coverage improvement. The SBFD operation may improve a system capacity, resource utilization, and/or spectrum efficiency. The SBFD operation may enable a flexible and dynamic uplink/downlink resource adaption according to uplink/downlink traffic in a robust manner.

As indicated above, FIG. 5 is provided as an example. Other examples may differ from what is described with regard to FIG. 5.

For a network node that serves multiple UEs, one or more UEs, of the multiple UEs, may be CPEs or WABs. Each CPE/WAB may also serve multiple UEs. For example, a CPE may further connect to multiple UEs via wired links. A WAB may further connect to multiple UEs via wireless links. A UE, such as a CPE/WAB, may have a larger array and/or a higher transmit power, as compared to another UE, such as a smart phone. The larger array and/or the higher transmit power may cause interference.

Figure 6:
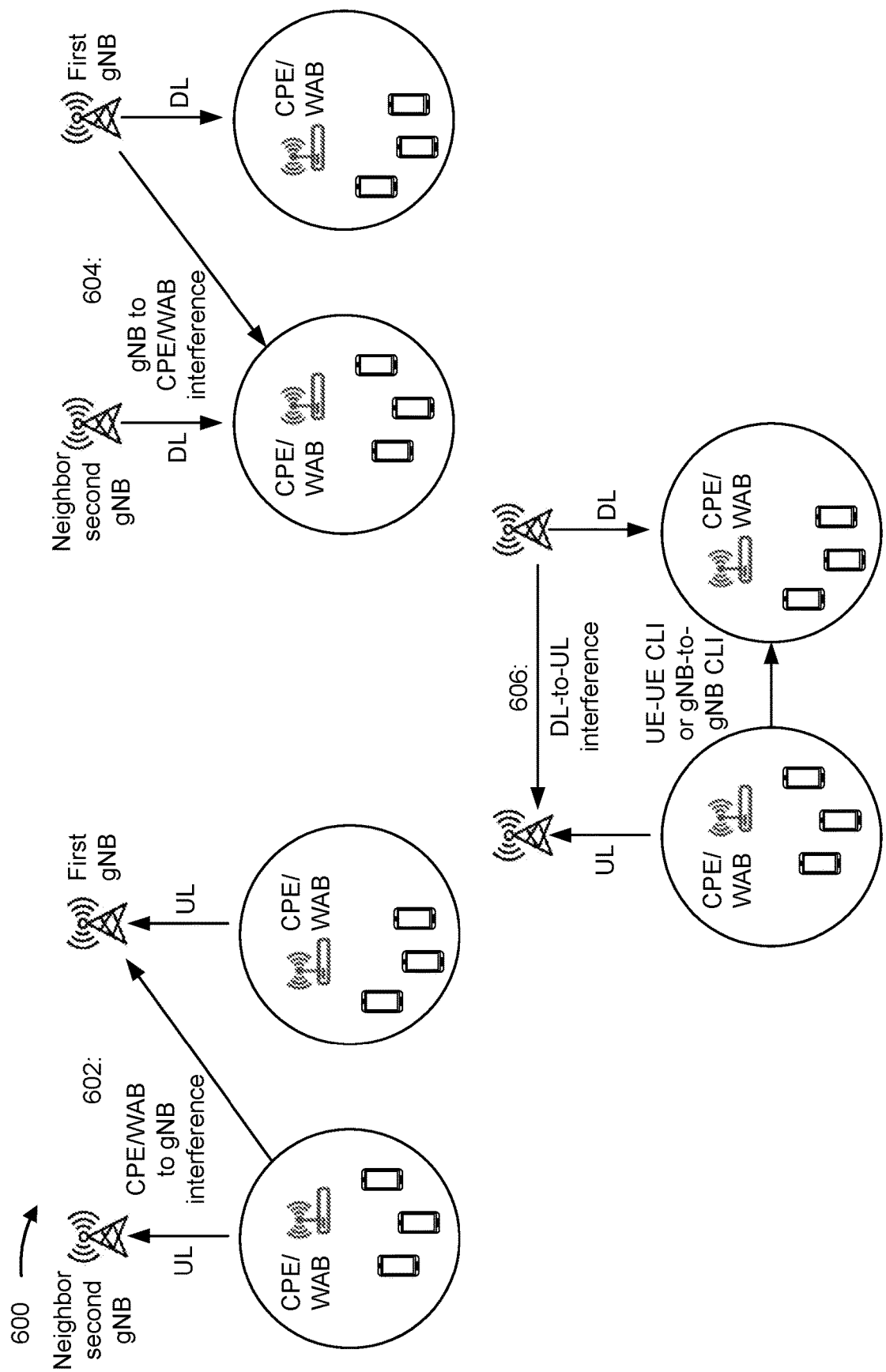
FIG. 6 is a diagram illustrating an example of interference, in accordance with the present disclosure.

FIG. 6 is a diagram illustrating an example 600 of interference, in accordance with the present disclosure.

In some aspects, a first network node (e.g., first gNB) may be associated with a first set of UEs (e.g., CPEs/WABs and/or non-CPEs/WABs). The first network node may perform downlink/uplink transmissions to the first set of UEs. A neighbor second network node (e.g., neighbor second gNB) may be associated with a second set of UEs (e.g., CPEs/WABs and/or non-CPEs/WABs). The second network node may perform downlink/uplink transmissions to the second set of UEs.

As shown by reference number 602, in a first scenario, a UE (e.g., CPE/WAB) of the neighbor second network node may interfere with an uplink reception of the first network node, thereby causing a CPE/WAB-to-gNB interference. As shown by reference number 604, in a second scenario, a downlink reception of the first network node may interfere with a downlink reception of a UE (e.g., CPE/WAB) of the neighbor second network node, thereby causing a gNB-to-CPE/WAB interference. As shown by reference number 606, in a third scenario, an uplink transmission of a UE (e.g., CPE/WAB) of the first network node may interfere with a downlink reception of a UE (e.g., CPE/WAB) of the neighbor second network node, thereby causing a UE-to-UE CLI for a dynamic TDD and SBFD scenario. In one example, when a WAB is associated with a DU functionality, a gNB-to-gNB CLI may result.

As indicated above, FIG. 6 is provided as an example. Other examples may differ from what is described with regard to FIG. 6.

An interferer, such as a UE (e.g., CPE/WAB) or a network node, may need to be distinguished so that the network node, or a CU or an operations and management (OAM) entity, may apply interference mitigation to CPE/WAB-to-gNB links. However, the UE and/or the network node may not be configured to identify the interferer in such situations, thereby resulting in a lack of interference mitigation to the CPE/WAB-to-gNB links. The lack of interference mitigation to the CPE/WAB-to-gNB links may degrade a performance of the UE and/or the network node.

In various aspects of techniques and apparatuses described herein, a network node may receive an indication of an identifier of a neighbor UE associated with a neighbor network node, a location and mobility status of a UE served by the network node, and/or beam adaptation information of the UE served by the network node. The UE may be a CPE or a WAB. The UE may operate with a larger antenna array as compared to en eMBB UE. The network node may perform an interference mitigation for the UE served by the network node based at least in part on the indication of the identifier of the neighbor UE, the location and mobility status of the UE, and/or the beam adaptation information of the UE. The interference mitigation may include a UE-to-UE CLI mitigation, a network-node-to-network-node CLI mitigation, a UE-to-network-node interference mitigation, or a network node-to-UE interference mitigation. The interference mitigation may improve a performance of the UE and/or the network node.

In some aspects, multiple network nodes may perform SBFD communications with multiple UEs, such as multiple CPEs/WABs, which may result in interference. The UE (e.g., CPE/WAB) may report multiple parameters to the network node, which may allow the network node to coordinate interference between the multiple UEs. A CPE/WAB may be associated with a larger antenna array and/or a higher transmit power, as compared to other types of UEs (e.g., smart phones), which may lead to more severe interference as compared to the other types of UEs. In order to enable interference mitigation for CPE/WAB-to-gNB links, an interferer UE identifier (ID), such as a CPE/WAB ID, may be used to distinguish the CPE/WAB. Location and mobility status and beam adaptation information may be indicated to enable the interference mitigation for CPE/WAB-to-gNB links. Signaling for measuring UEs with relatively large antenna arrays, such as CPEs/WABs, may be defined, which may be used for the interference mitigation for CPE/WAB-to-gNB links. The interference mitigation for CPE/WAB-to-gNB links may improve a performance (e.g., higher data rates) of the UE and/or the network node.

Figure 7:
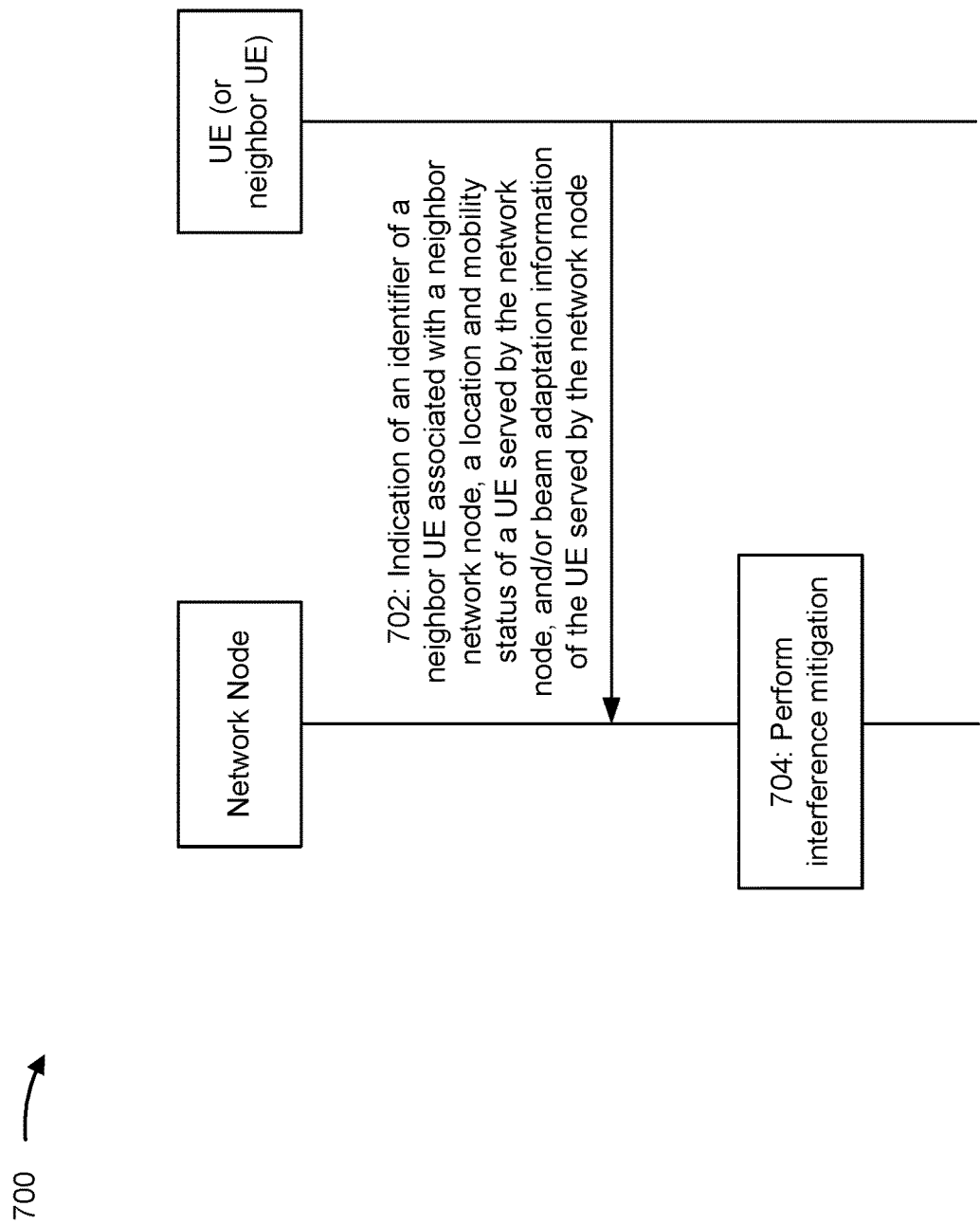
FIG. 7 is a diagram illustrating an example associated with interference mitigation for a UE, in accordance with the present disclosure.

FIG. 7 is a diagram illustrating an example 700 associated with interference mitigation for a UE. As shown in FIG. 7, example 700 includes communication between a UE (e.g., UE 120) and a network node (e.g., network node 110). In some aspects, the UE and the network node may be included in a wireless network, such as wireless network 100. In some aspects, the UE may be a CPE/WAB. The UE may operate with a larger antenna array as compared to an eMBB UE.

As shown by reference number 702, the network node may receive an indication of one or more of: an identifier of a neighbor UE associated with a neighbor network node, a location and mobility status of a UE served by the network node, or beam adaptation information of the UE served by the network node. The neighbor UE may be a CPE/WAB. The identifier of the neighbor UE ma be a CPE ID or a WAB ID. The indication of the location and mobility status of the UE may be a flag with one or more bits, where the one or more bits may indicate whether the UE is fixed, mobile, semi-static fixed, frequently moving, or rotation only. The location and mobility status of the UE may indicate movement statistics or additional assistance information, the movement statistics including one or more of a location changing rate, a coherence time, a best cell, and/or a best beam changing rate. The additional assistance information may include an antenna array size. The beam adaptation information of the UE may indicate whether one or more of beams, antenna arrays, or corresponding time-frequency resource patterns of the UE are adaptable. The network node may transmit the location and mobility status and/or the beam adaptation information, of the UE, to the neighbor network node via a backhaul signaling or an OTA signaling for interference mitigation.

In some aspects, the network node may exchange a scrambling ID of a served UE, such as a CPE/WAB, with neighbor network nodes, which may assist the neighbor network nodes with to distinguish an interferer UE ID, such as a CPE/WAB ID. When a channel is reciprocal, a neighbor network node may be an interferer of the CPE/WAB as well. With exchanged information, such as the exchanged scrambling ID of the served UE, the network node may further coordinate on scheduling a frequency/beam to avoid using a relatively strong CLI beam at the same time, thereby mitigating interference on a CPE/WAB-to-gNB link.

In some aspects, different interference handling may be employed for a fixed UE (e.g., the CPE/WAB) versus a mobile UE (e.g., a mobile phone). For the fixed UE, the interference on the CPE/WAB-to-gNB link may have a longer term impact, as compared to the mobile UE. The fixed UE may be associated with limited choices and less flexibility for interference mitigation, as compared to the mobile UE, so the network node may consider providing more accommodations to the fixed UE for interference mitigation, as compared to the mobile UE. Since the mobile UE is able to move, interference for the mobile UE may disappear or change, so a measurement periodicity may be configured more frequency for the mobile UE, as compared to the fixed UE.

In some aspects, the UE (e.g., a CPE/WAB or a mobile phone) and/or the network node may indicate its location and mobility status. The UE may indicate, to the network node, the location and mobility status associated with the UE. The network node may indicate, to the UE, the location and mobility status associated with the network node. In some aspects, an indication of location and mobility status may be a flag with one bit or multiple bits, where one or multiple bits may indicate that the UE or the network node is fixed, mobile, semi-static fixed, frequently moving, rotation only, and so on. In some aspects, the indication of location and mobility status may indicate movement statistics, such as a location changing rate, a coherence time, a best cell/beam changing rate, and so on. The indication of location and mobility status may indicate additional assistance information, such as an antenna array size, which may assist to determine a potential interference level.

In some aspects, the UE (e.g., a CPE/WAB or a mobile phone) and/or the network node may indicate its beam adaptation information. The UE may indicate, to the network node, the beam adaptation information associated with the UE. The network node may indicate, to the UE, the beam adaptation information associated with the network node. The beam adaptation information may indicate whether beams, antenna arrays, and/or corresponding time/frequency resource patterns, of the UE or the network node, may be changed. When the beams, the antenna arrays, and/or the corresponding time/frequency resource patterns may not be changed (e.g., for a stationary UE), and when a neighbor network node is an aggressor network node, interference may need to be avoided by the network node (e.g., a victim network node). For example, the network node may need to adjust scheduled beam or time/frequency resources to mitigate the neighbor network node's interference to the UE.

In some aspects, the UE (e.g., the CPE/WAB) may transmit, to the network node (e.g., a serving gNB), an indication of beam adaptation information for UE-to-UE CLI and UE-to-gNB interference mitigation. The network node may exchange the beam adaptation information to neighbor network nodes for interference mitigation. The network node may exchange the beam adaptation information to the neighbor network nodes using backhaul signaling or OTA signaling. The network node, when mobile, may exchange the beam adaptation information to the neighbor network nodes or to a CU/OAM using backhaul signaling or OTA signaling for inter-gNB CLI mitigation.

In some aspects, the network node may measure a UE-to-network-node interference from the UE interfering the neighbor network node. The network node may measure a network-node-to-UE interference from the UE interfering the neighbor network node depending on a channel reciprocity. Measurements of the UE-to-network-node interference or the network-node-to-UE-interference may be based at least in part on a periodic uplink transmission, a semi-persistent uplink transmission, and/or an uplink reference signal between the network node and the neighbor network node via a backhaul signaling or an OTA signaling. The uplink reference signal may include a sounding reference signal (SRS).

In some aspects, the network node may receive measurement results associated with the UE. The network node may transmit the measurement results to the neighbor network node via a backhaul signaling or an OTA signaling for the interference mitigation. The measurement results may indicate a measured interference based at least in part on ongoing downlink traffic transmitted on an active uplink transmit beam. The ongoing downlink traffic may be received and measured using the active uplink transmit beam. The measurement results may indicate a measured interference based at least in part on ongoing downlink traffic transmitted on an active downlink receive beam. The ongoing downlink traffic may be received and measured using the active downlink receive beam. The measurement results may be based at least in part on downlink transmissions between the network node and the neighbor network node. The measurement results may be based at least in part on a reference signal. The reference signal may include a channel state information reference signal (CSI-RS) or a synchronization signal block (SSB).

In some aspects, the network node may measure UE-to-gNB interference from the neighbor network node's serving UE (e.g., CPE/WAB). The network node May measure gNB-to-UE interference from the neighbor network node's serving UE, when a channel is reciprocal. In either case, measurements may be performed via ongoing uplink traffic, which may involve an exchange of ongoing uplink transmissions (e.g., periodic uplink transmissions) between network nodes via backhaul signaling or OTA signaling to obtain the measurements.

In some aspects, the UE (e.g., CPE/WAB) may measure interference based at least in part on ongoing downlink traffic transmitted on an active uplink beam. The UE may receive signals with its active uplink transmit beam and perform measurements of the signals, which may allow the UE to measure UE-to-neighbor-gNB interference when the channel is reciprocal. The UE may measure interference based at least in part on ongoing downlink traffic transmitted on an active downlink beam. The UE may receive signals with its active downlink receive beam for its own serving network node. The UE may measure the signals, which may allow the UE to measure neighbor-gNB-to-UE interference. In either case, the UE may report interference measurement results to the network node (e.g., serving gNB). The network node may exchange the measurement results among other network nodes via backhaul signaling or OTA signaling for interference mitigation. Further, in either case, measurements may be performed via ongoing downlink traffic, which may involve an exchange of ongoing downlink transmissions (e.g., periodic downlink transmissions) between network nodes via backhaul signaling or OTA signaling to obtain the measurements.

In some aspects, ongoing uplink traffic or ongoing downlink traffic may be replaced by reference signals, which may be used to obtain measurements. The reference signals may include an SRS, a CSI-RS, or an SSB.

As shown by reference number 704, the network node may perform an interference mitigation for the UE served by the network node based at least in part on the indication of one or more of: the identifier of the neighbor UE, the location and mobility status of the UE, or the beam adaptation information of the UE. The network node, when performing the interference mitigation, may coordinate or adjust a scheduled beam or time-frequency resource to avoid using an interference beam at a same time or at a same time-frequency resource as the neighbor UE. The interference mitigation may include a UE-to-UE CLI mitigation, a network-node-to-network-node CLI mitigation, a UE-to-network-node interference mitigation, or a network node-to-UE interference mitigation. The network node may perform the interference mitigation based at least in part on a predefined rule. The predefined rule may be based at least in part on a traffic priority, the location and mobility status indicated by the UE, and/or the beam adaptation information indicated by the UE.

In some aspects, network node and/or the UE may be configured (e.g., via a predefinition in a specification or via signaling) to implement interference mitigation for CPE/WAB-to-gNB links. The network node and/or the UE may implement the interference mitigation based at least in part on the traffic priority, an indicated location and mobility status, and/or indicated beam adaptation information.

As indicated above, FIG. 7 is provided as an example. Other examples may differ from what is described with regard to FIG. 7.

Figure 8:
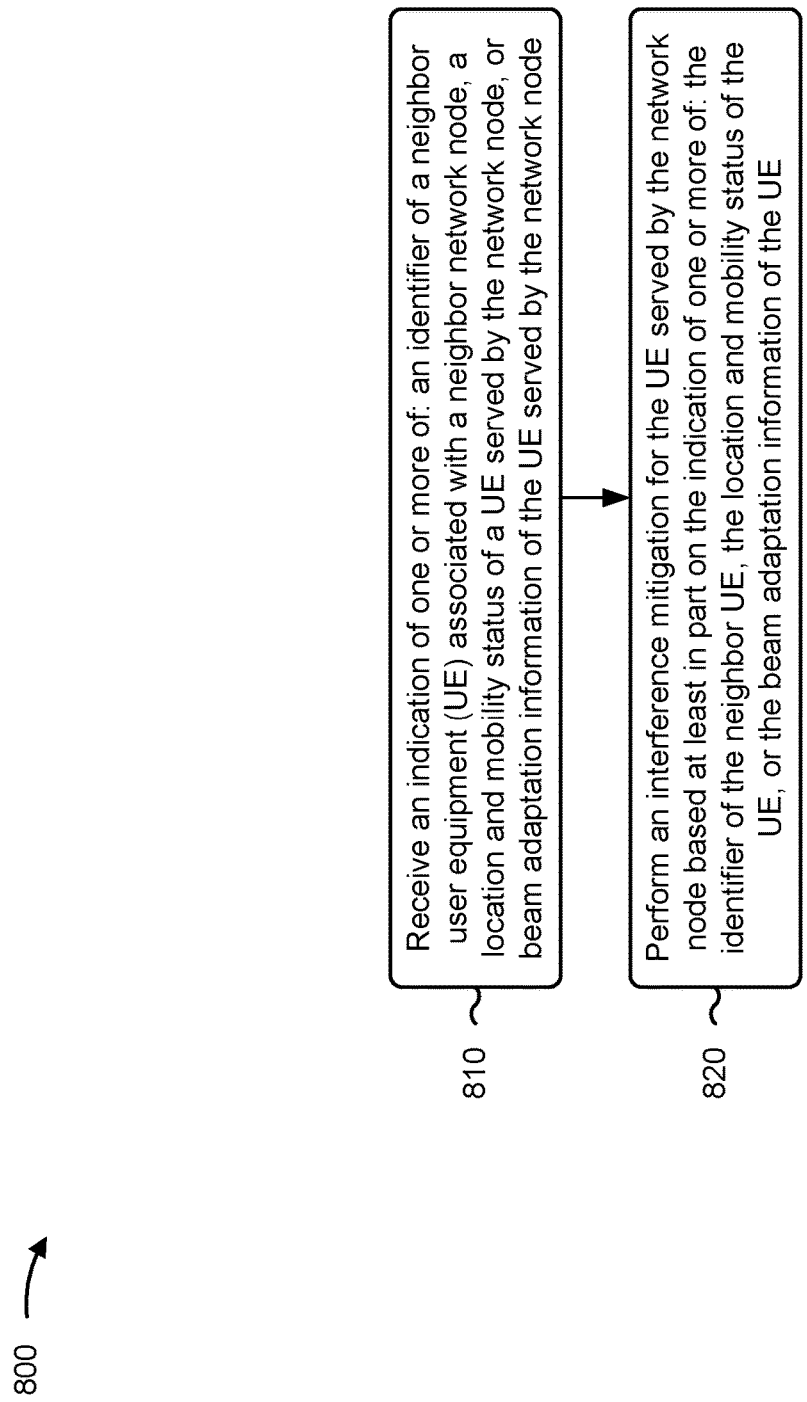
FIGS. 8-9 are diagrams illustrating example processes associated with interference mitigation for a UE, in accordance with the present disclosure.

FIG. 8 is a diagram illustrating an example process 800 performed, for example, by a network node, in accordance with the present disclosure. Example process 800 is an example where the network node (e.g., network node 110) performs operations associated with interference mitigation for a UE.

As shown in FIG. 8, in some aspects, process 800 may include receiving an indication of one or more of: an identifier of a neighbor UE associated with a neighbor network node, a location and mobility status of a UE served by the network node, or beam adaptation information of the UE served by the network node (block 810). For example, the network node (e.g., using reception component 1002 and/or communication manager 1006, depicted in FIG. 10) may receive an indication of one or more of: an identifier of a neighbor UE associated with a neighbor network node, a location and mobility status of a UE served by the network node, or beam adaptation information of the UE served by the network node, as described above.

As further shown in FIG. 8, in some aspects, process 800 may include performing an interference mitigation for the UE served by the network node based at least in part on the indication of one or more of: the identifier of the neighbor UE, the location and mobility status of the UE, or the beam adaptation information of the UE (block 820). For example, the network node (e.g., using communication manager 1006, depicted in FIG. 10) may perform an interference mitigation for the UE served by the network node based at least in part on the indication of one or more of: the identifier of the neighbor UE, the location and mobility status of the UE, or the beam adaptation information of the UE, as described above.

Process 800 may include additional aspects, such as any single aspect or any combination of aspects described below and/or in connection with one or more other processes described elsewhere herein.

In a first aspect, the UE is a CPE or a WAB, and the UE operates with a larger antenna array as compared to an eMBB UE.

In a second aspect, alone or in combination with the first aspect, the neighbor UE is a CPE or a WAB, and the identifier of the neighbor UE is a CPE identifier or a WAB identifier.

In a third aspect, alone or in combination with one or more of the first and second aspects, process 800 includes coordinating or adjusting a scheduled beam or time-frequency resource to avoid using an interference beam at a same time or at a same time-frequency resource as the neighbor UE.

In a fourth aspect, alone or in combination with one or more of the first through third aspects, the indication of the location and mobility status of the UE is a flag with one or more bits, the one or more bits indicating whether the UE is fixed, mobile, semi-static fixed, frequently moving, or rotation only.

In a fifth aspect, alone or in combination with one or more of the first through fourth aspects, the location and mobility status of the UE indicates one or more of movement statistics or additional assistance information, the movement statistics including one or more of a location changing rate, a coherence time, or a best cell or beam changing rate, and the additional assistance information including an antenna array size.

In a sixth aspect, alone or in combination with one or more of the first through fifth aspects, the beam adaptation information of the UE indicates whether one or more of beams, antenna arrays, or corresponding time-frequency resource patterns of the UE are adaptable.

In a seventh aspect, alone or in combination with one or more of the first through sixth aspects, process 800 includes transmitting one or more of the location and mobility status or the beam adaptation information, of the UE, to the neighbor network node via a backhaul signaling or an OTA signaling for interference mitigation.

In an eighth aspect, alone or in combination with one or more of the first through seventh aspects, process 800 includes measuring a UE-to-network-node interference from the UE interfering the neighbor network node, or measuring a network-node-to-UE interference from the UE interfering the neighbor network node depending on a channel reciprocity, wherein measurements of the UE-to-network-node interference or the network-node-to-UE-interference are based at least in part on one or more of a periodic uplink transmission, a semi-persistent uplink transmission, or an uplink reference signal between the network node and the neighbor network node via a backhaul signaling or an OTA signaling, and the uplink reference signal including an SRS.

In a ninth aspect, alone or in combination with one or more of the first through eighth aspects, process 800 includes receiving measurement results associated with the UE, and transmitting the measurement results to the neighbor network node via a backhaul signaling or an OTA signaling for the interference mitigation.

In a tenth aspect, alone or in combination with one or more of the first through ninth aspects, the measurement results indicate a measured interference based at least in part on ongoing downlink traffic transmitted on an active uplink transmit beam, the ongoing downlink traffic being received and measured using the active uplink transmit beam.

In an eleventh aspect, alone or in combination with one or more of the first through tenth aspects, the measurement results indicate a measured interference based at least in part on ongoing downlink traffic transmitted on an active downlink receive beam, the ongoing downlink traffic being received and measured using the active downlink receive beam.

In a twelfth aspect, alone or in combination with one or more of the first through eleventh aspects, the measurement results are based at least in part on downlink transmissions between the network node and the neighbor network node.

In a thirteenth aspect, alone or in combination with one or more of the first through twelfth aspects, the measurement results are based at least in part on a reference signal, the reference signal including a CSI-RS or an SSB.

In a fourteenth aspect, alone or in combination with one or more of the first through thirteenth aspects, the interference mitigation is performed by the network node based at least in part on a predefined rule, the predefined rule being based at least in part on a traffic priority, a location and mobility status indicated by the UE, or beam adaptation information indicated by the UE.

In a fifteenth aspect, alone or in combination with one or more of the first through fourteenth aspects, the interference mitigation includes a UE-to-UE CLI mitigation, a network-node-to-network-node CLI mitigation, a UE-to-network-node interference mitigation, or a network node-to-UE interference mitigation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
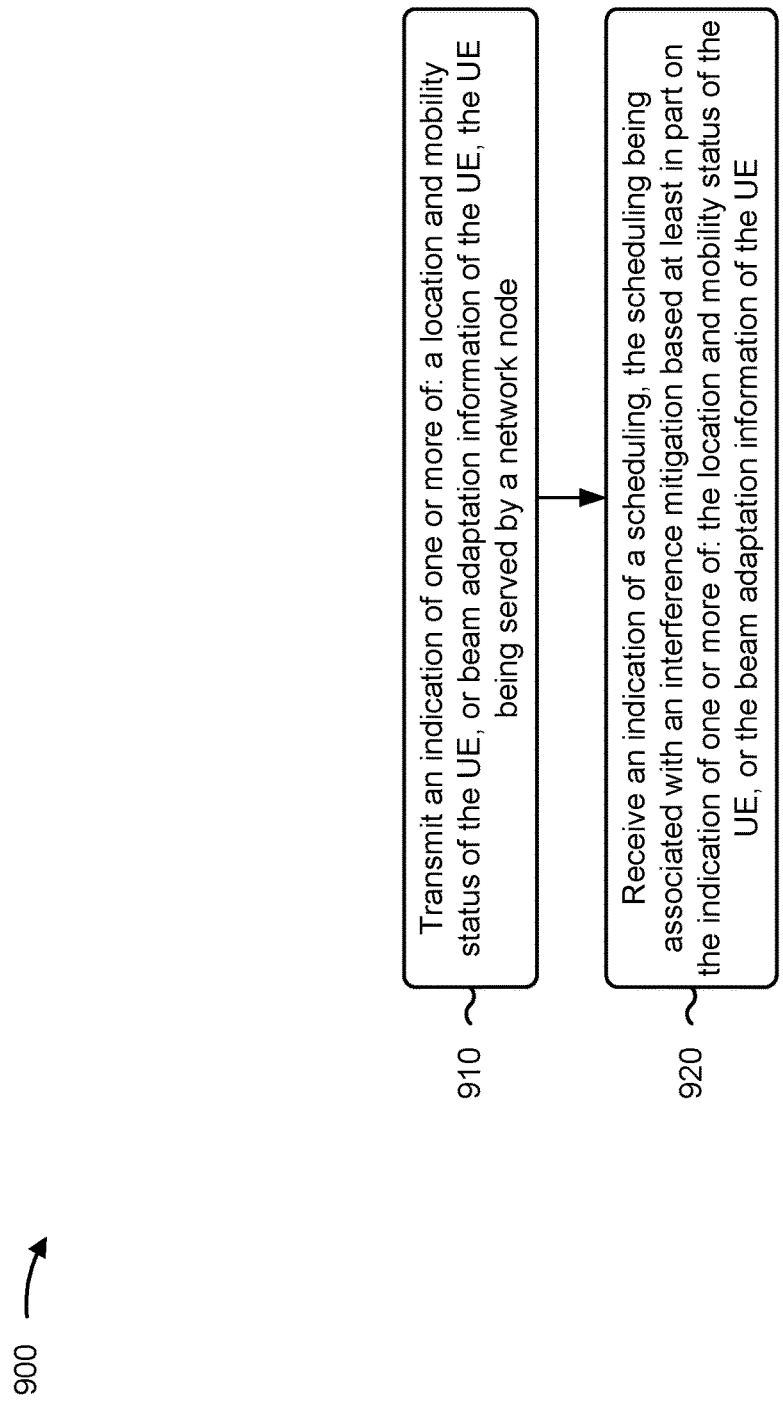

FIG. 9 is a diagram illustrating an example process 900 performed, for example, by a UE, in accordance with the present disclosure. Example process 900 is an example where the UE (e.g., UE 120) performs operations associated with interference mitigation for a UE.

As shown in FIG. 9, in some aspects, process 900 may include transmitting an indication of one or more of: a location and mobility status of the UE, or beam adaptation information of the UE, the UE being served by a network node (block 910). For example, the UE (e.g., using transmission component 1104 and/or communication manager 1106, depicted in FIG. 11) may transmit an indication of one or more of: a location and mobility status of the UE, or beam adaptation information of the UE, the UE being served by a network node, as described above.

As further shown in FIG. 9, in some aspects, process 900 may include receiving an indication of a scheduling, the scheduling being associated with an interference mitigation based at least in part on the indication of one or more of: the location and mobility status of the UE, or the beam adaptation information of the UE (block 920). For example, the UE (e.g., using reception component 1102 and/or communication manager 1106, depicted in FIG. 11) may receive an indication of a scheduling, the scheduling being associated with an interference mitigation based at least in part on the indication of one or more of: the location and mobility status of the UE, or the beam adaptation information of the UE, as described above.

Process 900 may include additional aspects, such as any single aspect or any combination of aspects described below and/or in connection with one or more other processes described elsewhere herein.

In a first aspect, the UE is a CPE or a WAB, and the UE operates with a larger antenna array as compared to an eMBB UE.

In a second aspect, alone or in combination with the first aspect, the interference mitigation is based at least in part on an identifier of a neighbor UE, the identifier being one of a CPE identifier or a WAB identifier associated with the neighbor UE.

In a third aspect, alone or in combination with one or more of the first and second aspects, the interference mitigation is based at least in part on a coordination or an adjustment of a scheduled beam or time-frequency resource to avoid using an interference beam at a same time or at a same time-frequency resource as a neighbor UE.

In a fourth aspect, alone or in combination with one or more of the first through third aspects, the indication of the location and mobility status of the UE is a flag with one or more bits, the one or more bits indicating whether the UE is fixed, mobile, semi-static fixed, frequently moving, or rotation only.

In a fifth aspect, alone or in combination with one or more of the first through fourth aspects, the location and mobility status of the UE indicates one or more of movement statistics or additional assistance information, the movement statistics including one or more of a location changing rate, a coherence time, or a best cell or beam changing rate, and the additional assistance information including an antenna array size.

In a sixth aspect, alone or in combination with one or more of the first through fifth aspects, the beam adaptation information of the UE indicates whether one or more of beams, antenna arrays, or corresponding time-frequency resource patterns of the UE are adaptable.

In a seventh aspect, alone or in combination with one or more of the first through sixth aspects, process 900 includes transmitting measurement results associated with the UE.

In an eighth aspect, alone or in combination with one or more of the first through seventh aspects, the measurement results indicate a measured interference based at least in part on ongoing downlink traffic transmitted on an active uplink transmit beam, the ongoing downlink traffic being received and measured using the active uplink transmit beam.

In a ninth aspect, alone or in combination with one or more of the first through eighth aspects, the measurement results indicate a measured interference based at least in part on ongoing downlink traffic transmitted on an active downlink receive beam, the ongoing downlink traffic being received and measured using the active downlink receive beam.

In a tenth aspect, alone or in combination with one or more of the first through ninth aspects, the measurement results are based at least in part on downlink transmissions between the network node and the neighbor network node.

In an eleventh aspect, alone or in combination with one or more of the first through tenth aspects, the measurement results are based at least in part on a reference signal, the reference signal including a CSI-RS or an SSB.

In a twelfth aspect, alone or in combination with one or more of the first through eleventh aspects, the interference mitigation is performed by the UE based at least in part on a predefined rule, the predefined rule being based at least in part on a traffic priority, a location and mobility status indicated by the UE, or beam adaptation information indicated by the UE.

In a thirteenth aspect, alone or in combination with one or more of the first through twelfth aspects, the interference mitigation includes a UE-to-UE CLI mitigation, a network-node-to-network-node CLI mitigation, a UE-to-network-node interference mitigation, or a network node-to-UE interference mitigation.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
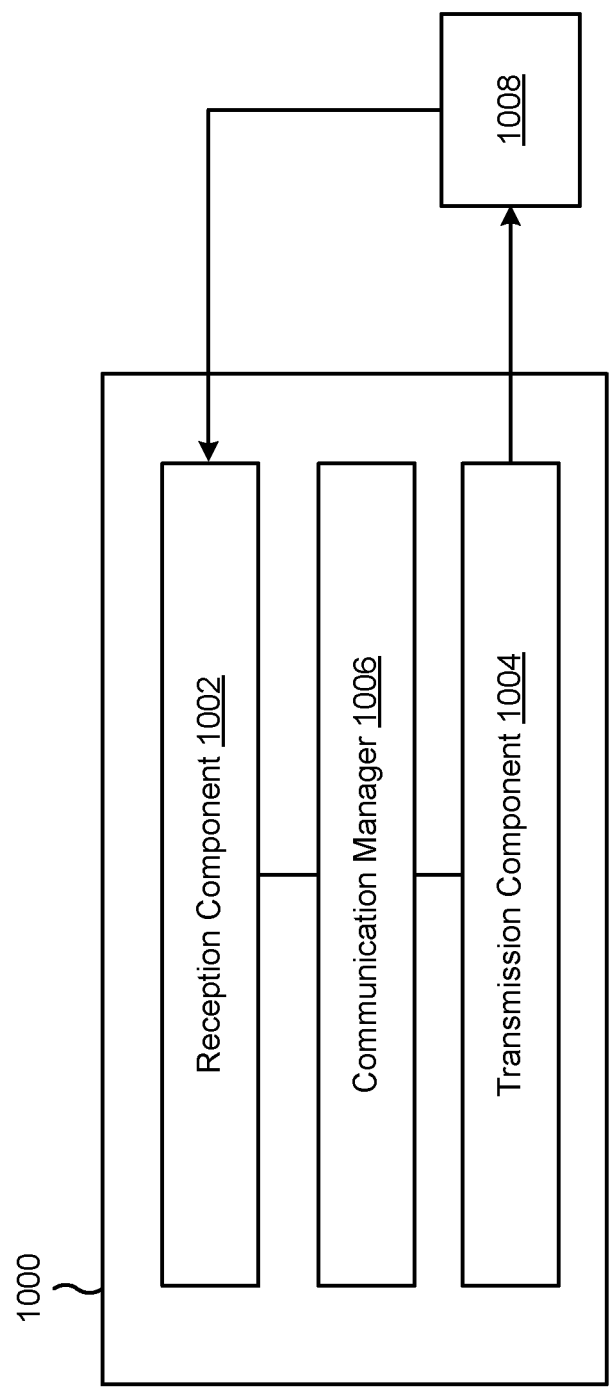
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive an indication of one or more of: an identifier of a neighbor UE associated with a neighbor network node, a location and mobility status of a UE served by the network node, or beam adaptation information of the UE served by the network node. The communication manager 1006 may perform an interference mitigation for the UE served by the network node based at least in part on the indication of one or more of: the identifier of the neighbor UE, the location and mobility status of the UE, or the beam adaptation information of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
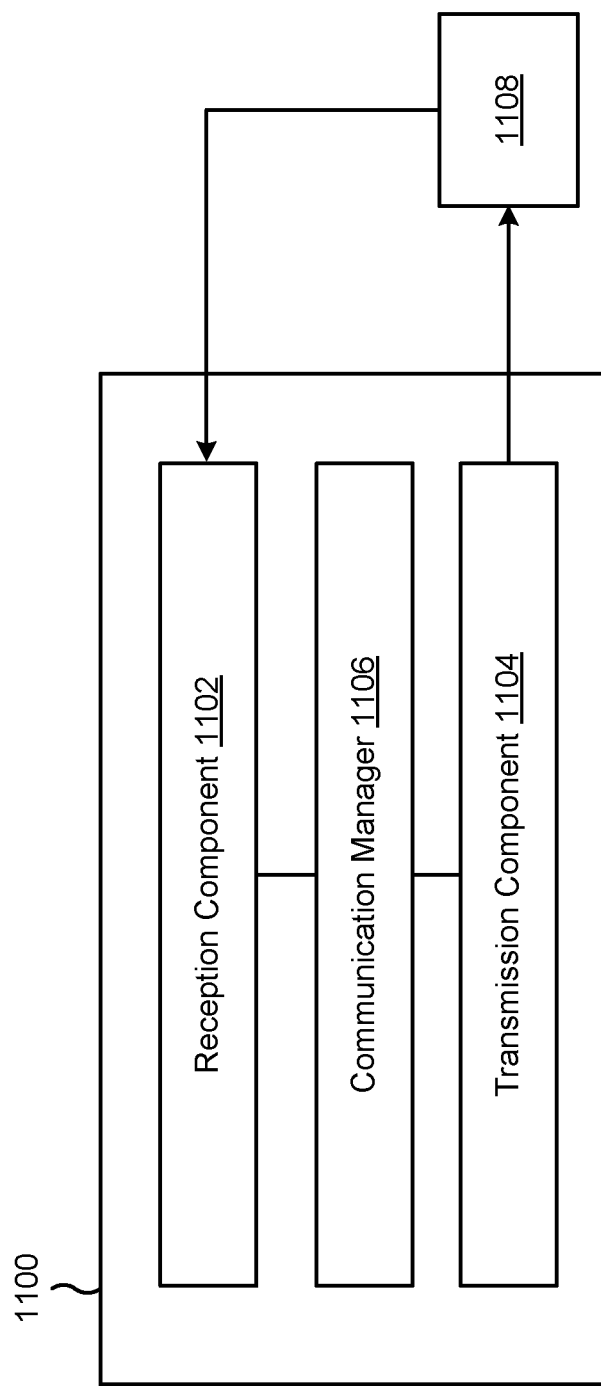

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit an indication of one or more of: a location and mobility status of the UE, or beam adaptation information of the UE, the UE being served by a network node. The reception component 1102 may receive an indication of a scheduling, the scheduling being associated with an interference mitigation based at least in part on the indication of one or more of: the location and mobility status of the UE, or the beam adaptation information of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a network node, comprising: receiving an indication of one or more of: an identifier of a neighbor UE associated with a neighbor network node, a location and mobility status of a UE served by the network node, or beam adaptation information of the UE served by the network node; and performing an interference mitigation for the UE served by the network node based at least in part on the indication of one or more of: the identifier of the neighbor UE, the location and mobility status of the UE, or the beam adaptation information of the UE.

Aspect 2: The method of Aspect 1, wherein the UE is a customer premise equipment (CPE) or a wireless access backhaul (WAB), and the UE operates with a larger antenna array as compared to an enhanced mobile broadband (eMBB) UE.

Aspect 3: The method of any of Aspects 1-2, wherein the neighbor UE is a customer premise equipment (CPE) or a wireless access backhaul (WAB), and the identifier of the neighbor UE is a CPE identifier or a WAB identifier.

Aspect 4: The method of any of Aspects 1-3, wherein performing the interference mitigation comprises coordinating or adjusting a scheduled beam or time-frequency resource to avoid using an interference beam at a same time or at a same time-frequency resource as a neighbor UE.

Aspect 5: The method of any of Aspects 1-4, wherein the indication of the location and mobility status of the UE is a flag with one or more bits, the one or more bits indicating whether the UE is fixed, mobile, semi-static fixed, frequently moving, or rotation only.

Aspect 6: The method of any of Aspects 1-5, wherein the location and mobility status of the UE indicates one or more of: movement statistics or additional assistance information, the movement statistics including one or more of a location changing rate, a coherence time, or a best cell or beam changing rate, and the additional assistance information including an antenna array size.

Aspect 7: The method of any of Aspects 1-6, wherein the beam adaptation information of the UE indicates whether one or more of beams, antenna arrays, or corresponding time-frequency resource patterns of the UE are adaptable.

Aspect 8: The method of any of Aspects 1-7, further comprising: transmitting one or more of: the location and mobility status or the beam adaptation information, of the UE, to the neighbor network node via a backhaul signaling or an over-the-air (OTA) signaling for interference mitigation.

Aspect 9: The method of any of Aspects 1-8, further comprising: measuring a UE-to-network-node interference from the UE interfering the neighbor network node; or measuring a network-node-to-UE interference from the UE interfering the neighbor network node depending on a channel reciprocity, wherein measurements of the UE-to-network-node interference or the network-node-to-UE-interference are based at least in part on one or more of: a periodic uplink transmission, a semi-persistent uplink transmission, or an uplink reference signal between the network node and the neighbor network node via a backhaul signaling or an over-the-air (OTA) signaling, and the uplink reference signal including a sounding reference signal (SRS).

Aspect 10: The method of any of Aspects 1-9, further comprising: receiving measurement results associated with the UE; and transmitting the measurement results to the neighbor network node via a backhaul signaling or an over-the-air (OTA) signaling for the interference mitigation.

Aspect 11: The method of Aspect 10, wherein the measurement results indicate a measured interference based at least in part on ongoing downlink traffic transmitted on an active uplink transmit beam, the ongoing downlink traffic being received and measured using the active uplink transmit beam.

Aspect 12: The method of Aspect 10, wherein the measurement results indicate a measured interference based at least in part on ongoing downlink traffic transmitted on an active downlink receive beam, the ongoing downlink traffic being received and measured using the active downlink receive beam.

Aspect 13: The method of Aspect 10, wherein the measurement results are based at least in part on downlink transmissions between the network node and the neighbor network node.

Aspect 14: The method of Aspect 10, wherein the measurement results are based at least in part on a reference signal, the reference signal including a channel state information reference signal (CSI-RS) or a synchronization signal block (SSB).

Aspect 15: The method of any of Aspects 1-14, wherein the interference mitigation is performed by the network node based at least in part on a predefined rule, the predefined rule being based at least in part on a traffic priority, a location and mobility status indicated by the UE, or beam adaptation information indicated by the UE.

Aspect 16: The method of any of Aspects 1-15, wherein the interference mitigation includes a UE-to-UE cross link interference (CLI) mitigation, a network-node-to-network-node CLI mitigation, a UE-to-network-node interference mitigation, or a network node-to-UE interference mitigation.

Aspect 17: A method of wireless communication performed by a user equipment (UE), comprising: transmitting an indication of one or more of: a location and mobility status of the UE, or beam adaptation information of the UE, the UE being served by a network node; and receiving an indication of a scheduling, the scheduling being associated with an interference mitigation based at least in part on the indication of one or more of: the location and mobility status of the UE, or the beam adaptation information of the UE.

Aspect 18: The method of Aspect 17, wherein the UE is a customer premise equipment (CPE) or a wireless access backhaul (WAB), and the UE operates with a larger antenna array as compared to an enhanced mobile broadband (eMBB) UE.

Aspect 19: The method of any of Aspects 17-18, wherein the interference mitigation is based at least in part on an identifier of a neighbor UE, the identifier being one of a customer premise equipment (CPE) identifier or a wireless access backhaul (WAB) identifier associated with the neighbor UE.

Aspect 20: The method of any of Aspects 17-19, wherein the interference mitigation is based at least in part on a coordination or an adjustment of a scheduled beam or time-frequency resource to avoid using an interference beam at a same time or at a same time-frequency resource as a neighbor UE.

Aspect 21: The method of any of Aspects 17-20, wherein the indication of the location and mobility status of the UE is a flag with one or more bits, the one or more bits indicating whether the UE is fixed, mobile, semi-static fixed, frequently moving, or rotation only.

Aspect 22: The method of any of Aspects 17-21, wherein the location and mobility status of the UE indicates one or more of: movement statistics or additional assistance information, the movement statistics including one or more of a location changing rate, a coherence time, or a best cell or beam changing rate, and the additional assistance information including an antenna array size.

Aspect 23: The method of any of Aspects 17-22, wherein the beam adaptation information of the UE indicates whether one or more of beams, antenna arrays, or corresponding time-frequency resource patterns of the UE are adaptable.

Aspect 24: The method of any of Aspects 17-23, further comprising: transmitting measurement results associated with the UE.

Aspect 25: The method of Aspect 24, wherein the measurement results indicate a measured interference based at least in part on ongoing downlink traffic transmitted on an active uplink transmit beam, the ongoing downlink traffic being received and measured using the active uplink transmit beam.

Aspect 26: The method of Aspect 24, wherein the measurement results indicate a measured interference based at least in part on ongoing downlink traffic transmitted on an active downlink receive beam, the ongoing downlink traffic being received and measured using the active downlink receive beam.

Aspect 27: The method of Aspect 24, wherein the measurement results are based at least in part on downlink transmissions between the network node and the neighbor network node.

Aspect 28: The method of Aspect 24, wherein the measurement results are based at least in part on a reference signal, the reference signal including a channel state information reference signal (CSI-RS) or a synchronization signal block (SSB).

Aspect 29: The method of any of Aspects 17-28, wherein the interference mitigation is performed by the UE based at least in part on a predefined rule, the predefined rule being based at least in part on a traffic priority, a location and mobility status indicated by the UE, or beam adaptation information indicated by the UE.

Aspect 30: The method of any of Aspects 17-29, wherein the interference mitigation includes a UE-to-UE cross link interference (CLI) mitigation, a network-node-to-network-node CLI mitigation, a UE-to-network-node interference mitigation, or a network node-to-UE interference mitigation.

Aspect 31: An apparatus for wireless communication at a device, comprising a processor; memory coupled with the processor; and instructions stored in the memory and executable by the processor to cause the apparatus to perform the method of one or more of Aspects 1-16.

Aspect 32: A device for wireless communication, comprising a memory and one or more processors coupled to the memory, the one or more processors configured to perform the method of one or more of Aspects 1-16.

Aspect 33: An apparatus for wireless communication, comprising at least one means for performing the method of one or more of Aspects 1-16.

Aspect 34: A non-transitory computer-readable medium storing code for wireless communication, the code comprising instructions executable by a processor to perform the method of one or more of Aspects 1-16.

Aspect 35: A non-transitory computer-readable medium storing a set of instructions for wireless communication, the set of instructions comprising one or more instructions that, when executed by one or more processors of a device, cause the device to perform the method of one or more of Aspects 1-16.

Aspect 36: An apparatus for wireless communication at a device, comprising a processor; memory coupled with the processor; and instructions stored in the memory and executable by the processor to cause the apparatus to perform the method of one or more of Aspects 17-30.

Aspect 37: A device for wireless communication, comprising a memory and one or more processors coupled to the memory, the one or more processors configured to perform the method of one or more of Aspects 17-30.

Aspect 38: An apparatus for wireless communication, comprising at least one means for performing the method of one or more of Aspects 17-30.

Aspect 39: A non-transitory computer-readable medium storing code for wireless communication, the code comprising instructions executable by a processor to perform the method of one or more of Aspects 17-30.

Aspect 40: A non-transitory computer-readable medium storing a set of instructions for wireless communication, the set of instructions comprising one or more instructions that, when executed by one or more processors of a device, cause the device to perform the method of one or more of Aspects 17-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a network node, comprising:
a memory; and
one or more processors, coupled to the memory, configured to:
receive an indication of one or more of: an identifier of a neighbor user equipment (UE) associated with a neighbor network node, a location and mobility status of a UE served by the network node, or beam adaptation information of the UE served by the network node; and
perform an interference mitigation for the UE served by the network node based at least in part on the indication of one or more of: the identifier of the neighbor UE, the location and mobility status of the UE, or the beam adaptation information of the UE.

2. The apparatus of claim 1, wherein the UE is a customer premise equipment (CPE) or a wireless access backhaul (WAB), and the UE operates with a larger antenna array as compared to an enhanced mobile broadband (eMBB) UE.

3. The apparatus of claim 1, wherein the neighbor UE is a customer premise equipment (CPE) or a wireless access backhaul (WAB), and the identifier of the neighbor UE is a CPE identifier or a WAB identifier.

4. The apparatus of claim 1, wherein the one or more processors, to perform the interference mitigation, are configured to coordinate or adjust a scheduled beam or time-frequency resource to avoid using an interference beam at a same time or at a same time-frequency resource as the neighbor UE.

5. The apparatus of claim 1, wherein the indication of the location and mobility status of the UE is a flag with one or more bits, the one or more bits indicating whether the UE is fixed, mobile, semi-static fixed, frequently moving, or rotation only.

6. The apparatus of claim 1, wherein the location and mobility status of the UE indicates one or more of: movement statistics or additional assistance information, the movement statistics including one or more of a location changing rate, a coherence time, or a best cell or beam changing rate, and the additional assistance information including an antenna array size.

7. The apparatus of claim 1, wherein the beam adaptation information of the UE indicates whether one or more of beams, antenna arrays, or corresponding time-frequency resource patterns of the UE are adaptable.

8. The apparatus of claim 1, wherein the one or more processors are further configured to:
transmit one or more of: the location and mobility status or the beam adaptation information, of the UE, to the neighbor network node via a backhaul signaling or an over-the-air (OTA) signaling for interference mitigation.

9. The apparatus of claim 1, wherein the one or more processors are further configured to:
measure a UE-to-network-node interference from the UE interfering the neighbor network node; or
measure a network-node-to-UE interference from the UE interfering the neighbor network node depending on a channel reciprocity,
wherein measurements of the UE-to-network-node interference or the network-node-to-UE-interference are based at least in part on one or more of: a periodic uplink transmission, a semi-persistent uplink transmission, or an uplink reference signal between the network node and the neighbor network node via a backhaul signaling or an over-the-air (OTA) signaling, and the uplink reference signal including a sounding reference signal (SRS).

10. The apparatus of claim 1, wherein the one or more processors are further configured to:
receive measurement results associated with the UE; and
transmit the measurement results to the neighbor network node via a backhaul signaling or an over-the-air (OTA) signaling for the interference mitigation.

11. The apparatus of claim 10, wherein the measurement results indicate a measured interference based at least in part on ongoing downlink traffic transmitted on an active uplink transmit beam, the ongoing downlink traffic being received and measured using the active uplink transmit beam.

12. The apparatus of claim 10, wherein the measurement results indicate a measured interference based at least in part on ongoing downlink traffic transmitted on an active downlink receive beam, the ongoing downlink traffic being received and measured using the active downlink receive beam.

13. The apparatus of claim 10, wherein the measurement results are based at least in part on downlink transmissions between the network node and the neighbor network node.

14. The apparatus of claim 10, wherein the measurement results are based at least in part on a reference signal, the reference signal including a channel state information reference signal (CSI-RS) or a synchronization signal block (SSB).

15. The apparatus of claim 1, wherein the interference mitigation is performed by the network node based at least in part on a predefined rule, the predefined rule being based at least in part on a traffic priority, a location and mobility status indicated by the UE, or beam adaptation information indicated by the UE.

16. The apparatus of claim 1, wherein the interference mitigation includes a UE-to-UE cross link interference (CLI) mitigation, a network-node-to-network-node CLI mitigation, a UE-to-network-node interference mitigation, or a network node-to-UE interference mitigation.

17. An apparatus for wireless communication at a user equipment (UE), comprising:
a memory; and
one or more processors, coupled to the memory, configured to:
transmit an indication of one or more of: a location and mobility status of the UE, or beam adaptation information of the UE, the UE being served by a network node; and
receive an indication of a scheduling, the scheduling being associated with an interference mitigation based at least in part on the indication of one or more of: the location and mobility status of the UE, or the beam adaptation information of the UE.

18. The apparatus of claim 17, wherein:
the indication of the location and mobility status of the UE is a flag with one or more bits, the one or more bits indicating whether the UE is fixed, mobile, semi-static fixed, frequently moving, or rotation only; or
the location and mobility status of the UE indicates one or more of: movement statistics or additional assistance information, the movement statistics including one or more of a location changing rate, a coherence time, or a best cell or beam changing rate, and the additional assistance information including an antenna array size.

19. The apparatus of claim 17, wherein the beam adaptation information of the UE indicates whether one or more of beams, antenna arrays, or corresponding time-frequency resource patterns of the UE are adaptable.

20. The apparatus of claim 17, wherein the one or more processors are further configured to:
transmit measurement results associated with the UE.

21. The apparatus of claim 20, wherein:
the measurement results indicate a measured interference based at least in part on ongoing downlink traffic transmitted on an active uplink transmit beam, the ongoing downlink traffic being received and measured using the active uplink transmit beam; or
the measurement results indicate a measured interference based at least in part on ongoing downlink traffic transmitted on an active downlink receive beam, the ongoing downlink traffic being received and measured using the active downlink receive beam.

22. The apparatus of claim 20, wherein:
the measurement results are based at least in part on downlink transmissions between the network node and a neighbor network node; or
the measurement results are based at least in part on a reference signal, the reference signal including a channel state information reference signal (CSI-RS) or a synchronization signal block (SSB).

23. The apparatus of claim 17, wherein the interference mitigation is performed by the UE based at least in part on a predefined rule, the predefined rule being based at least in part on a traffic priority, a location and mobility status indicated by the UE, or beam adaptation information indicated by the UE.

24. The apparatus of claim 17, wherein the interference mitigation includes a UE-to-UE cross link interference (CLI) mitigation, a network-node-to-network-node CLI mitigation, a UE-to-network-node interference mitigation, or a network node-to-UE interference mitigation.

25. A method of wireless communication performed by a network node, comprising:
receiving an indication of one or more of: an identifier of a neighbor user equipment (UE) associated with a neighbor network node, a location and mobility status of a UE served by the network node, or beam adaptation information of the UE served by the network node; and
performing an interference mitigation for the UE served by the network node based at least in part on the indication of one or more of: the identifier of the neighbor UE, the location and mobility status of the UE, or the beam adaptation information of the UE.

26. The method of claim 25, wherein performing the interference mitigation comprises coordinating or adjusting a scheduled beam or time-frequency resource to avoid using an interference beam at a same time or at a same time-frequency resource as a neighbor UE.

27. The method of claim 25, further comprising:
transmitting one or more of: the location and mobility status or the beam adaptation information, of the UE, to the neighbor network node via a backhaul signaling or an over-the-air (OTA) signaling for interference mitigation.

28. The method of claim 25, further comprising:
measuring a UE-to-network-node interference from the UE interfering the neighbor network node; or
measuring a network-node-to-UE interference from the UE interfering the neighbor network node depending on a channel reciprocity,
wherein measurements of the UE-to-network-node interference or the network-node-to-UE-interference are based at least in part on one or more of: a periodic uplink transmission, a semi-persistent uplink transmission, or an uplink reference signal between the network node and the neighbor network node via a backhaul signaling or an over-the-air (OTA) signaling, and the uplink reference signal including a sounding reference signal (SRS).

29. The method of claim 25, further comprising:
receiving measurement results associated with the UE; and
transmitting the measurement results to the neighbor network node via a backhaul signaling or an over-the-air (OTA) signaling for the interference mitigation.

30. A method of wireless communication performed by a user equipment (UE), comprising:
transmitting an indication of one or more of: a location and mobility status of the UE, or beam adaptation information of the UE, the UE being served by a network node; and
receiving an indication of a scheduling, the scheduling being associated with an interference mitigation based at least in part on the indication of one or more of: the location and mobility status of the UE, or the beam adaptation information of the UE.

\* \* \* \* \*